United States Patent [19]

Merrick

[11] Patent Number: 5,416,841
[45] Date of Patent: May 16, 1995

[54] CRYPTOGRAPHY SYSTEM

[75] Inventor: Roland A. Merrick, Worchestershire, United Kingdom

[73] Assignee: International Business Machines Corporation, Armonk, N.Y.

[21] Appl. No.: 170,555

[22] Filed: Dec. 20, 1993

[30] Foreign Application Priority Data

Dec. 19, 1992 [GB] United Kingdom ............... 9226511

[51] Int. Cl.$^6$ .................... H04L 9/06; H04L 9/14; H04L 9/00
[52] U.S. Cl. .......................................... 380/29; 380/1; 380/9; 380/28; 380/44; 380/49; 380/21
[58] Field of Search ................. 380/1, 9, 28, 29, 33, 380/43, 44, 46, 49, 50, 21

[56] References Cited

U.S. PATENT DOCUMENTS 4,935,961 6/1990 Gargiulo et al. .................... 380/21

OTHER PUBLICATIONS

IBM TDB, vol. 33, No. 9, Feb. 1991, pp. 195–198, "Cryptographic Initialization Test" (the whole document).
Proceedings 25th Annual 1991 IEEE International Carnahan Conference on Security Technology, 1–3 Oct. 1991, Taipei, Taiwan; pp. 59–67; K. J. Fram et al. "An Authenticate Processing for the Information System in Industrial Technology Research Institute", p. 60, left col., line 1—line 34; table 1.
C. C. Foster, *Cryptanalysis for Microcomputers;* (Hayden Book Co.; Rochelle Park, N.J.; 1982; pp. 223–224).
T. Beth, *Lecture Notes in Computer Science* (149); (Springer–Verlag; 1983; pp. 235–255).
*FIPS Publication 46-1,* ANS X3.92–1981/R1987; (U.S. Govt. Printing Office, 1988).

*Primary Examiner*—Bernarr E. Gregory
*Attorney, Agent, or Firm*—John E. Hoel; Kenneth A. Seaman

[57] ABSTRACT

A cryptographic system includes a conventional DES facility for encrypting data using a key of N (=56) bits. The user however need only supply a first key of n bits, which is passed to a key management system. The key management system generates a second key of length N-n bits, which is combined with the first key to produce a full-length key of N bits. This full-length key is then passed to the DES facility to allow data to be encrypted and saved in a data store in the conventional manner. The value of n can be controlled such that if the user forgets the first key, it can be located in a reasonable time on a simple trial and error basis, thereby allowing retrieval of the encrypted data.

7 Claims, 3 Drawing Sheets

CRYPTOGRAPHY SYSTEM

DESCRIPTION

1. Field of the Invention

The present invention relates to cryptography systems for encrypting data, and the retrieval of stored encrypted data.

2. Background of the Invention

Computers are commonly used for storing confidential information. One way of protecting this information is to control access to it, typically by the use of passwords. However, this approach does not provide a high degree of security, since the protection fails if the password check can somehow be circumvented, or perhaps if the data is intercepted whilst in transmission from one machine to another. A more sophisticated approach therefore is to encrypt the data itself, so that even if the encrypted data is acquired by an unauthorized party, they will still not be able to understand or make use of it.

Various algorithms have been developed for the encryption of such data. Most modern algorithms depend for their security on a key (equivalent to a password) which is used in the coding/decoding process. The algorithm itself used for encryption may be widely known, but the encrypted data will remain secure as long as the integrity of the key is not compromised.

Typically there are two ways of breaking an encryption scheme without a prior knowledge of the key. Firstly, there is a brute force trial and error method--essentially trying every possible key until the uncoded form is obtained. To counter this approach the key can be made long. The number of possible key values that must be tried then becomes so large that the chance of successfully breaking the code in a reasonable time is negligible. Alternatively, it may be possible to exploit some theoretical weakness in the encoding scheme, thereby obviating the need to try large numbers of possible keys and leading to a much quicker decoding of the data. Whilst this latter approach may be very difficult from a mathematical point of view (and perhaps impossible for some encryption schemes), it is a potentially very powerful approach since it would allow access to all data encoded with that particular algorithm. By contrast the trial and error approach, even if successful, is only effective for that key value, and would need to be repeated for each data set having a different key value.

Perhaps the most widely used encryption technique is the Data Encryption Standard (DES), described for example in "Cryptography" by Meyer and Matyas (Wiley 1982) and "Security for Computer Networks" by Davies and Price (Wiley 1984). This highly advanced algorithm has the advantage that despite very extensive testing there are no known successful forms of analytical attack. Furthermore, the key length is long (56 bits), so that for all intents and purposes the brute force approach is impracticable. The DES has therefore been widely adopted both because of its perceived security, and also because highly reliable and efficient systems (hardware/software) have been developed for its implementation.

The DES is particularly well-suited to use with extremely sensitive data that must be strongly encrypted, for example in many banking applications. However, there is a reluctance to use it for some less sensitive commercial applications, due to concerns about difficulties in maintaining the keys. GB 2216754A discloses a system in which the working key is generated from a precursor stored in memory, plus a password inputted by the user. This approach reduces the need for strict security to be maintained around the precursor.

In such a system however, or in a conventional encryption facility, the key or password may be forgotten or lost, or become otherwise unavailable, perhaps because the owner dies or leaves the company, or simply refuses to divulge it (e.g. to obtain an advantage over the legitimate asset owner, such as the user's employer). In such circumstances, the encoded data to all intents and purposes becomes unrecoverable. To avoid this happening, complicated and expensive key management procedures are required.

OBJECTS OF THE INVENTION

It is an object of the invention to provide a cryptography system in which the user can input a short key that is easily remembered.

SUMMARY OF THE INVENTION

Accordingly, the invention provides a cryptography system for encrypting data comprising:

means for encrypting data using an algorithm having a key of length N characters;

means for receiving from a user a first key of length n characters, where n is less than N and is determined as a function of the length of time required to break the algorithm based on trying all possible keys of length n on a trial and error basis;

means for generating a second key of length N-n characters; means for combining the first and second keys into a full-length key;

and means for passing the full-length key to the encryption means.

Thus the full-length key used to encrypt the data is formed from two separate components. Typically the encryption algorithm used will determine the size of this full-length key. Thus for example, in a preferred embodiment, the encryption algorithm used is based on the DES, where the N characters of the full-length key equate to 56 bits. Although such a long key provides an extremely high degree of security, if the key is forgotten, then the data becomes effectively irrecoverable. However, by splitting the key up into two components, the consequences of a partial key can be substantially reduced. It is not actually necessary for users to be aware that they are not providing the whole key. For example, they may supply a full-length key, but unbeknown to them, the system only utilizes part of it to combine with the second key in order to generate the full-length key.

It should be appreciated that whilst the means for generating a second key will normally be automatic (i.e., producing a machine-generated key), in some cases it may be desirable to have two human key holders. In this case the means for generating a second key would simply be responsible for obtaining the second key from the appropriate person. Although this particular approach is well-suited to specific situations (e.g., joint employee/manager access), in most circumstances it will be more convenient for the second key to be generated automatically.

Since n is determined as a function of the length of time required to break the encryption based on a trial and error approach, the relative lengths of the two portions of the key are arranged to avoid the problems of the prior art associated with a key or portion thereof becoming unavailable. A preferred embodiment therefore further comprises a cyptoanalysis unit for retrieving the data on a trial and error basis by trying all possible values for said first key until the correct value is found, and the rate at which the cyptoanalysis unit can try possible values is used in determining n.

This arrangement has the advantage that if the user does forget or lose the key, or it becomes unavailable for some other reason, it is still possible to retrieve the data, albeit at the expenditure of some computing effort. It should be appreciated however, that from an external viewpoint the security of the data has not been degraded, since it is still encrypted using the full power of the DES, or whatever other algorithm is chosen. This ensures that the cryptography system of the invention benefits from the reliability and security of the full-length algorithm. Furthermore, such algorithms are also normally available on purpose hardware processors, or highly efficient software implementations.

The cryptographic system of the invention is particularly suited to situations where it is desired to store confidential data (e.g., personnel files, customer lists etc.) which must not become unavailable, but which do not merit the complicated and expensive procedures necessary to ensure that a full-length key is not lost.

In order to break the encryption, an adversary would have to obtain access to either the first or the second keys plus the encrypted data. The cryptographic system of the present invention offers greater security than conventional methods in the former situation (which would correspond to divulgation of the complete password in conventional methods) since the second key will normally still be required to access the data, although it may be feasible to determine this on a trial and error basis, dependent on the relative lengths of the first and second keys.

The security of the cryptographic system of the present invention is dependent to a large extent on the integrity of the key management system. Various measures can be taken to render this facility as secure as possible. For example, the second keys can be randomly generated, to make it difficult to guess or deduce their value. Note that it is important that the second key is not generated based on the first key, since this would potentially allow an adversary who had access to either of the first or second keys to determine the other, and thereby the full-length key. In a preferred embodiment, the second keys are stored in encrypted form, and access restricted to authorized users. It may also be possible to combine the first and second keys in some relatively sophisticated way to generate the full-length key, rather than simply append one to another.

It is also preferred that the cryptographic system further comprises means for determining a suitable value of n. One system is based on the user inputting a security classification, which can then be translated into a recommended (or specified) length for the first key. By providing the user with assistance of this form, the possibility of their selecting an unsuitably long or short first key can be avoided.

The invention also provides a method for encrypting data in a system including means for implementing a data encryption algorithm having a key of length N characters, the method comprising the steps of:

receiving from a user a first key of length n characters, where n is less than N and is determined as a function of the length of time required to break the algorithm based on trying all possible keys of length n on a trail and error basis;

generating a second key of length N-n characters;

combining the first and second keys into a full-length key; and passing the full-length key to the encryption means.

It is preferred that data stored in accordance with the above method can be retrieved by:

testing a value for said first key that has not been tested before;

combining the test value for said first key with said second key to generate a full-length key;

retrieving and decrypting the data using said full-length key;

examining the decrypted data to see if the test value is correct;

whereby said steps are repeated until the correct value of said first key has been obtained.

DESCRIPTION OF THE FIGURES

An embodiment of the invention will now be described by way of example with reference to the following drawings.

DISCUSSION OF THE PREFERRED EMBODIMENT

Figure 1:
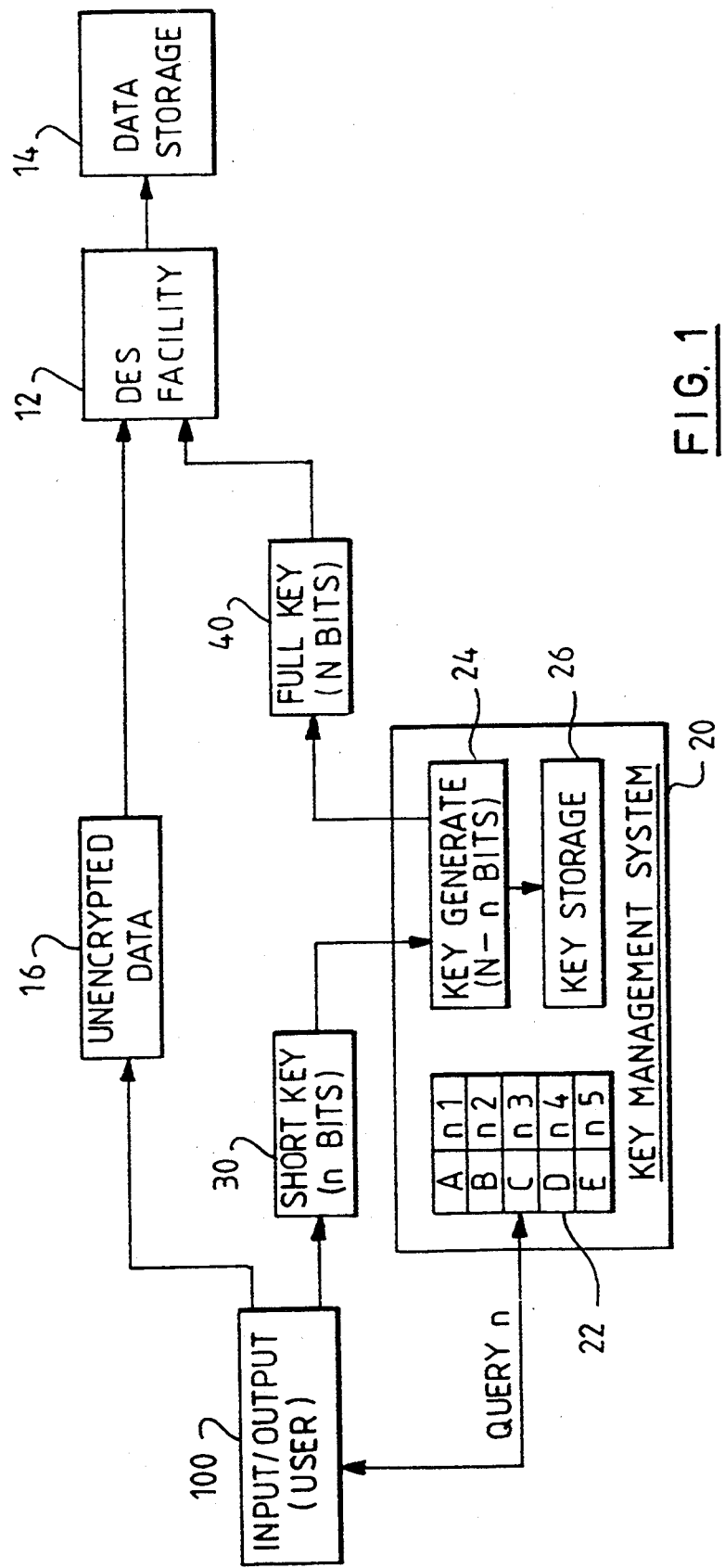
FIG. 1 is a schematic diagram illustrating a cryptographic system being used for storing data.

FIG. 1 illustrates a cryptographic system, typically based on some form of computer. The type of computer is not important and could be a personal computer such as an IBM PS/2, a mainframe, such as an IBM ES/9000, or some intermediate machine. The computer includes an encryption facility 12 based on the Data Encryption Standard (DES), which uses a key length of $N=56$ bits. The encryption facility is provided on a special purpose hardware component which offers an extremely efficient, reliable and secure implementation of the DES algorithm. If desired, the DES facility could be replaced by any other encryption facility offering similar advantages. Attached to the DES is a data store 14 for the storage of encrypted data.

When a user 100 has some data 16 to store in encrypted form, but does not want to use directly the full 56 bit key length required by the DES, then the first step is generally to interact with the key management system 20 in order to determine a modified key length. In the example illustrated, the user decides initially upon an appropriate security level (e.g., perhaps graded A-E). The key management system then refers to a conversion table 22 to determine a value "n" (n1, n2, . . . ) that corresponds to the selected security classification, where n represents the number of bits in the key that the user has to create. The basis on which the conversion table is produced is discussed in more detail below.

There are several other ways in which a suitable value of n might be arrived at. For example, the user may already know the value of n corresponding to the desired level of security. Alternatively, the length of password appropriate for any particular user, or class of user, may already be determined by the system and stored in a manner analogous to the conversion table of FIG. 1. In such a case, the user will simply request a value for n and be returned a value based on the stored information.

In order to store data the user supplies to the key management facility a first key 30 of length n bits. The key management facility includes a key generation unit 24 which produces a second key of N-n bits. This is then combined with the first key to make a full-length (N=56 bits) key 40 for use with the DES cryptographic facility. The data can then be encrypted and stored in conventional manner. The second key of N-n bits can be generated in a variety of ways. It may be a simple constant, it may depend on the date of the transaction, it may depend on the user, or it may be generated randomly.

It is necessary for the key management system to store details of the N-n bits that it generated for that transaction in a key storage unit 26. However, details of the n bits supplied by the user should not be stored since this would allow anyone obtaining access to the key management system to potentially decode the encrypted data. Typically the second key of length N-n will be stored against the filename of the stored data (the name used to identify the data in the data storage unit 14). Alternatively, if the key is based on the user ID alone, then the retrieval could be performed automatically, although this approach assumes that only one user id can access the data.

Figure 2:
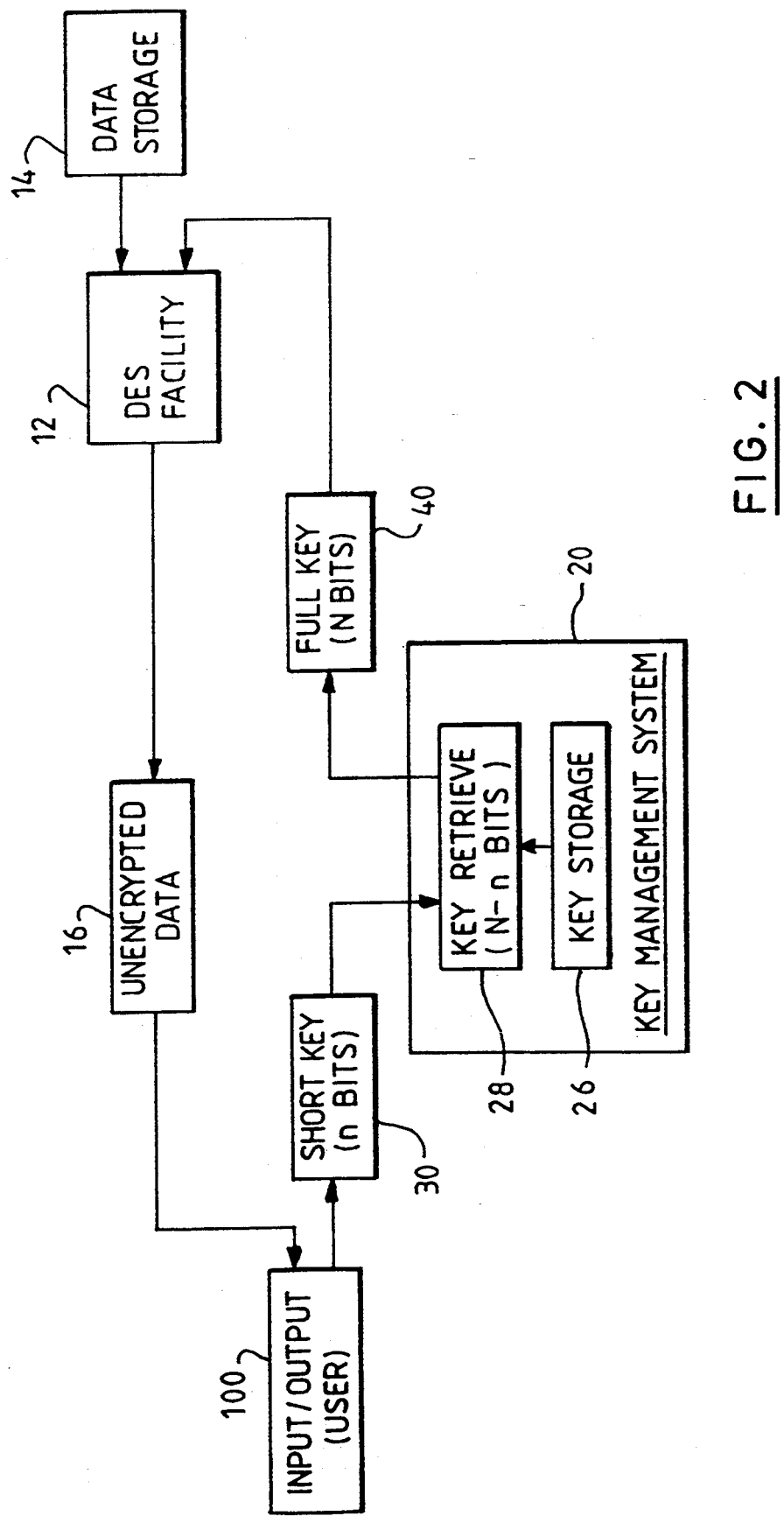
FIG. 2 is a schematic diagram illustrating the cryptographic system of FIG. 1 being used for retrieving data.
Figure 3:
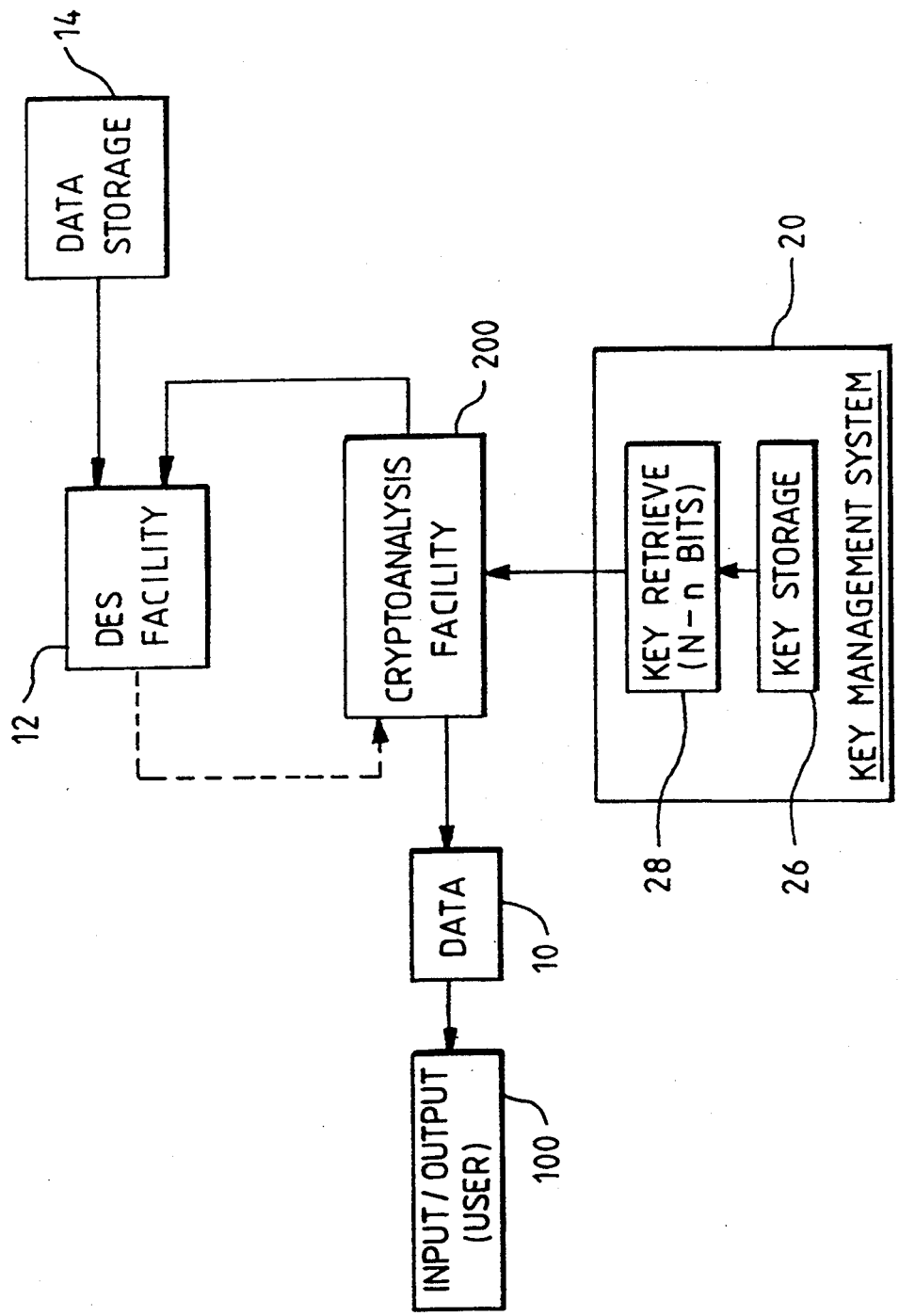
FIG. 3 shows the cryptographic system of FIG. 2 with an added cryptoanalysis facility.

FIG. 2 shows the components of the cryptographic system of FIG. 1 involved in the retrieval/decryption of data. Thus the user 100 desires to retrieve the data 16 stored in encrypted form in the data storage unit 14. In order to achieve this, the user supplies the key management system 20 with the user created first key 30 with a length of n bits that was originally used to store the data. The key management system contains a key retrieval unit 28 which then accesses the key storage unit 26 to retrieve the second key of N-n bits used to store the data. In general the user will also have to supply some additional information, depending on how keys are stored, to the key management system to allow it to identify the transaction and retrieve the correct key. Typically the additional information will simply be the filename of the relevant data in the data storage unit. Once the second key has been obtained, it can be combined with the first key to produce the full-length key 40. This N bit key is then passed to the DES facility 12, along with appropriate information to allow identification of the data in the data storage unit (e.g., a filename), to allow the data to be retrieved and decrypted in a conventional manner.

Clearly a potential problem arises if the user 100 has forgotten the first key 30. For this reason, the cryptographic system also includes a cyptoanalysis unit 200 (see FIG. 2). Thus in situations where the user has forgotten the first key or it has otherwise become unavailable, the second key of N-n bits is first retrieved from the key storage unit. It is assumed that the user can remember sufficient information to retrieve the second key: for example, if the stored keys are accessed via the filename of the data concerned, then the user only has to remember this filename (without this it would be impossible anyway to identify the correct data in the data storage unit).

The cryptoanalysis unit then takes the second key, and combines it with a trial value for the first key. This is then supplied to the DES facility which is asked to retrieve the relevant data (or at least part of it). The retrieved data can then be tested to see if it makes sense (e.g., does it contain dictionary words), and if not, the cyptoanalysis unit automatically passes on to another trial value for the first key.

The values of n to be used for any particular encryption/storage operation are therefore determined based on the estimated time that would be required to break the code on a brute force trial and error basis - i.e., by trying every possible sequence of n bits until the correct one is found (a process sometimes referred to as key exhaustion). For the DES the times required to search given numbers of keys (known as the work factor) have already been considered —see the discussion on page 139 of the "Cryptography" book mentioned above, and references therein. The time required to search every possible 56 bit key is (deliberately) quite prohibitive. However, by limiting the effective key length to n rather than N, the work factor or number of possible keys to search can be greatly reduced (it is assumed that the N-n bits generated by the key management system can be successfully retrieved), allowing the key to be broken in a realistic time.

Essentially, each increase in the length of the user-selected key by one bit doubles the work factor. This allows reasonable control over the security of any particular piece of data, from trivially small values of n (in low single figures for example) which could be broken without any undue effort, to larger values of n which may be designed to require hours or days to break passwords. Of course, the exact time taken to locate a particular key is unpredictable, since it depends on the power of the computer being used, and furthermore there is a random element in that success may occur at the beginning or end of a search. Nevertheless, the degree of control does provide for a reasonable graduation in security versus trial and error decoding time.

One facility not shown in the diagrams, but which may be usefully added to the cryptography system of the present invention, is a key conversion unit. This unit converts an alphanumeric or alphabetical string into a bit sequence (the required length for the bit sequence determines the necessary length of the string). The advantage of such a facility, which is well-known in the prior art, is that it is much easier for the user to generate a memorable string than a memorable bit sequence. Furthermore, it is easy for the unit to generate bit sequences of any required length (not just limited to whole numbers of bytes) from a sufficiently long string.

Many other variations are possible on the above embodiment. For example, the use of two keys may be transparent to the user, who provides a full-length key for both encryption and decryption, although in effect part of this is discarded by the It may also be desirable to have two human key holders. In this case, the key generating unit would simply request the second key from the second person. In such a case it is unlikely that the computer would store the second key, or indeed any information at all about the two keys (such as their respective lengths). This approach is perhaps less convenient, since two people need to be involved, but may well be appropriate to particular situations.

Although a specific embodiment of the invention has been disclosed, it will be understood by those having skill in the art, that changes can be made to that specific embodiment without departing from the spirit and the scope of the invention.

What is claimed is:

1. A cryptography system for encrypting data comprising:
    means for encrypting data using an algorithm having a key of length N characters;
    means for receiving from a user a first key of length n characters, where n is less than N and;
    means for generating a second key of length N-n characters;
    means for combining the first and second keys into a full-length key;
    and means for passing the full-length key to the means for encrypting.

2. The system of claim 1, further comprising a cyptoanalysis unit for retrieving the data on a trial and error basis by trying all possibilities values for said first key until the correct value is found, wherein the rate at which the cyptoanalysis unit can try possible values is used in determining n.

3. The system of claim 1, wherein the encryption algorithm is based on the Data Encryption Standard, and a full-length key of 56 bits (N=56).

4. The system of claim 1, further comprising means for storing said second key of length N-n characters in encrypted form.

5. The system of claim 1, further comprising means for determining a suitable value of n.

6. A method for encrypting data in a system including means for implementing a data encryption algorithm having a key of length N characters, the method comprising the steps of:
    receiving from a user a first key of length n characters, where n is less than N and is determined as a function of the length of time required to break the algorithm based on trying all possible keys of length n on a trial and error basis;
    generating a second key of length N-n characters;
    combining the first and second keys into a full-length key; and
    passing the full-length key to means for implementing a data encryption means.

7. A method of retrieving encrypted data stored in accordance with the method of claim 6, further comprising the steps of:
    selecting a test value for said first key that has not been tested before;
    combining the test value for said first key with said second key to generate a full-length key;
    retrieving and decrypting the data using said full-length key;
    examining the decrypted data to see if plain text is received, indicating the test value is correct; whereby said steps are repeated until the correct value of said first key has been obtained.

* * * * *